2 Sheets--Sheet 1.

WILSON ELDER.

Improvement in Attaching Carriage Wheels to their Axles.

No. 4,830. Reissued March 26, 1872.

Witnesses
Edwin J. McLain
John Williams

Inventor
Wilson Elder
by L. M. Poole

AM. PHOTO-LITHOGRAPHIC CO. N.Y. (OSBORNE'S PROCESS.)

2 Sheets--Sheet 2.

WILSON ELDER.

Improvement in Attaching Carriage Wheels to their Axles.

No. 4,830. Reissued March 26, 1872.

Witnesses
Edwin J. McBain.
John Williams

Inventor
Wilson Elder
by
S. M. Poole

AM. PHOTO-LITHOGRAPHIC CO. N.Y. (OSBORNE'S PROCESS.)

UNITED STATES PATENT OFFICE.

WILSON ELDER, OF MILL HALL, PENNSYLVANIA, ASSIGNOR TO SAMUEL G. MORRISON.

IMPROVEMENT IN ATTACHING CARRIAGE-WHEELS TO THEIR AXLES.

Specification forming part of Letters Patent No. 110,557, dated December 27, 1870; reissue No. 4,830, dated March 26, 1872.

*To all whom it may concern:*

Be it known that I, WILSON ELDER, of Mill Hall, in the county of Clinton and State of Pennsylvania, have invented a new and Improved Mode of Securing the Wheels upon the Axles of Wagons, Carriages, &c.; and I do hereby declare that the following is a full and exact description thereof, reference being had to the accompanying drawing and the letters of reference marked thereon.

Figure 1:
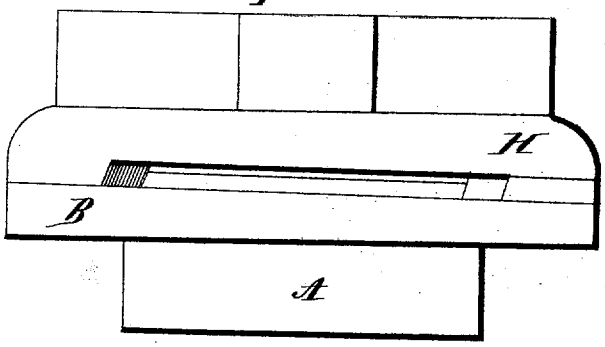
Figure 2:
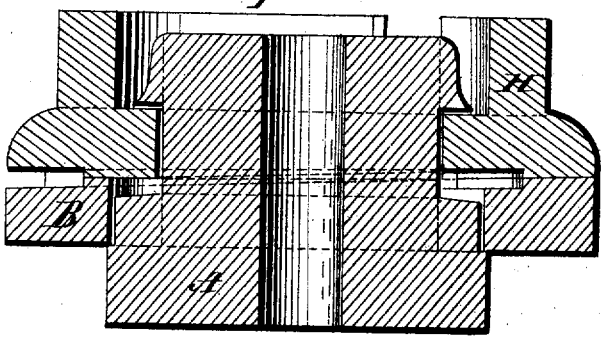
Figure 3:
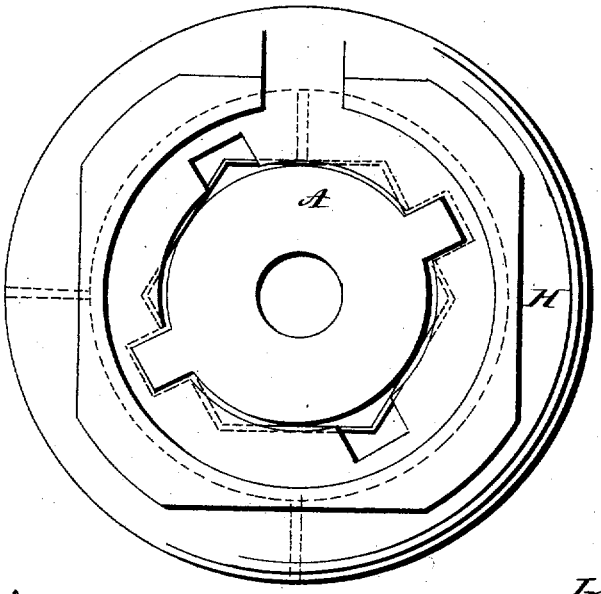

Figure 1 of the drawing represents a plan view of my device. Fig. 2 is a sectional view. Fig. 3 is a front view; and Figs. 4, 5, 6, 7, and 8 are details.

My invention has relation to means for securing carriage-wheels upon their axles, and consists in the construction and novel arrangement of a beveled washer and bevel-cap upon the spindle of the axle, and held in place by suitable lugs, as hereinafter particularly mentioned and described.

Figure 4:
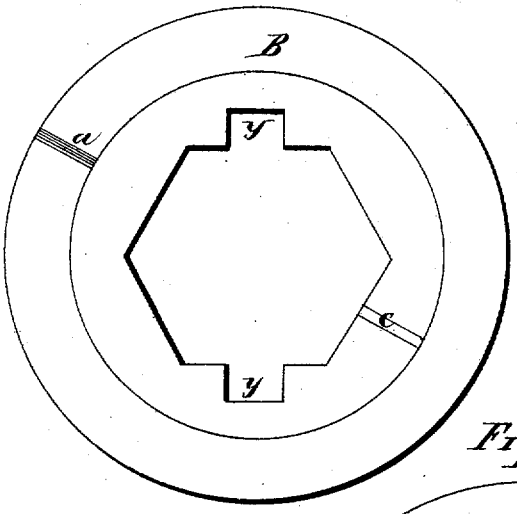
Figure 5:
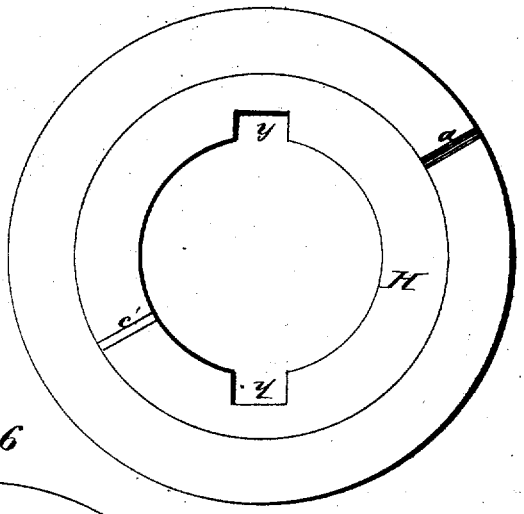
Figure 6:
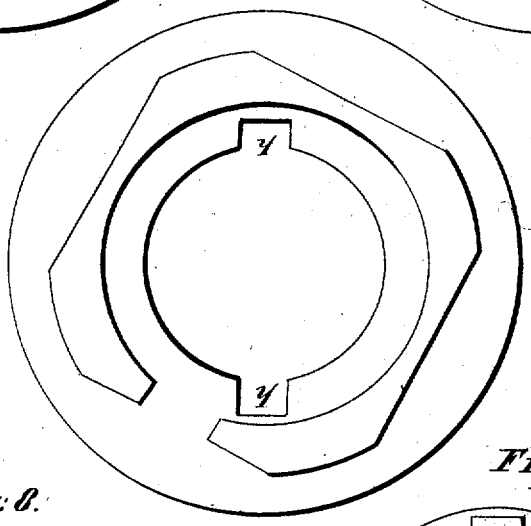
Figure 7:
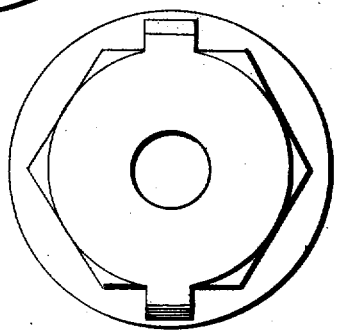
Figure 8:
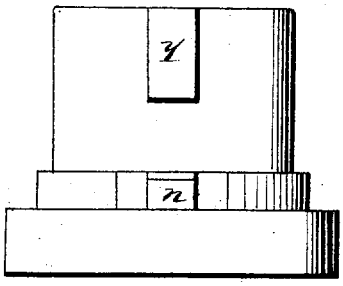

A of the drawing represents a carriage-axle; and B, a washer, having a beveled outer face, as shown on Fig. 4. This washer has two shoulders, marked, respectively, *a* and *c*, from the bases of which the bevel commences, and forms gradual inclined planes to their tops, as shown. The letter H represents a cap, constructed with a beveled inner surface or face, with openings or slots, marked *y*; it also has shoulders, marked *a* and *c*, and its beveled portion corresponds in all respects with the bevels of the washer B, against and with which it operates. The axle A is constructed with angular shoulders, as shown on Fig. 7, and the washer B is adapted to fit thereon. I also attach ears or lugs upon said shoulders, marked *n*, to fill the corresponding openings in the washers, made in order to pass the lugs, marked *y'*, upon the spindle, when placing it in position. The letters *y' y'* represent ears or lugs, fixed on the point of the spindle, and which correspond with the opening or slots *y y* in the washer and cap, and are intended to hold the cap in its position on the spindle.

To operate my device I first place the wheel upon the spindle, and arrange the washers upon its shoulders in such manner that its rear side shall rest against the wheel under its flange, while its beveled face shall turn outward. I then take the cap H, and after placing its beveled face against the washer I turn it to the right or left, respectively, until it is firmly wedged inside of and against the lugs *y y*. When this is accomplished the wheel is secure upon the axle and ready for use.

I claim as my invention—

1. The washer B, when constructed and used substantially as specified.

2. The cap H, with its bevel-face or inclined plane, and slots or openings *y y*, substantially as and for the purposes specified.

3. A spindle of a wagon-axle having lugs upon the point thereon adapted to pass through openings *y y* in the cap H and to lock the same, substantially as and for the purposes set forth.

4. In combination with the washer B and cap H, the lugs *y'*, when arranged upon the spindle of an axle, all constructed substantially as and for the purposes set forth.

WILSON ELDER.

Witnesses:
A. L. BLINT,
I. T. HUNTER.